Dec. 22, 1970  H. J. BALDWIN ET AL  3,548,495
MATERIAL CUTTING MACHINE HAVING SHARPENING BANDS
FOR SHARPENING RECIPROCATING CUTTING BLADE
Filed July 31, 1968  5 Sheets-Sheet 1

INVENTORS.
HERMAN J. BALDWIN
DAVID I. MCDONALD

BY Frank C. Leach jr.

ATTORNEY.

FIG. 2

Dec. 22, 1970  H. J. BALDWIN ET AL  3,548,495
MATERIAL CUTTING MACHINE HAVING SHARPENING BANDS
FOR SHARPENING RECIPROCATING CUTTING BLADE
Filed July 31, 1968  5 Sheets-Sheet 3

Dec. 22, 1970   H. J. BALDWIN ET AL   3,548,495
MATERIAL CUTTING MACHINE HAVING SHARPENING BANDS
FOR SHARPENING RECIPROCATING CUTTING BLADE
Filed July 31, 1968   5 Sheets-Sheet 5

FIG. 8

# United States Patent Office 3,548,495
Patented Dec. 22, 1970

3,548,495
MATERIAL CUTTING MACHINE HAVING SHARPENING BANDS FOR SHARPENING RECIPROCATING CUTTING BLADE
Herman J. Baldwin and David I. McDonald, Cincinnati, Ohio, assignors to Cincinnati Milacron Inc., a corporation of Ohio
Filed July 31, 1968, Ser. No. 749,085
Int. Cl. B24b 19/00; B25f 3/00
U.S. Cl. 30—139
9 Claims

ABSTRACT OF THE DISCLOSURE

A material cutting machine has a pair of abrasive coated bands or belts to sharpen a rotatably mounted reciprocating cutting blade. The sharpening bands are held in a spaced and desired angular relation to the cutting blade when the cutting blade is rotated by being rotated therewith. When the cutting blade is to be sharpened, one of the bands is moved into engagement with the cutting blade during removal of the cutting blade from cutting engagement with the material with the tension on the other of the bands being reduced to remove the other band further from the cutting blade. The other band is moved into engagement with the other side of the cutting blade when the cutting blade is returned into cutting engagement with the material with the tension on the one band being reduced to remove the one band further from the cutting blade.

---

In material cutting machines of the type shown and described in the copending patent application of George W. Sederberg for "Material Cutting Machine Having Reciprocating Cutting Blade Adapted To Enter Material Without an Entrance Cut," Ser. No. 726,657, filed May 6, 1968, and assigned to the same assignee as the assignee of the present application, the cutting edge of the reciprocating cutting blade must always be sharp in order that the desired pattern will be formed in the material being cut. Furthermore, if the cutting edge of the reciprocating cutting blade should become dull, the life of the cutting blade would be substantially reduced.

One prior apparatus for sharpening a reciprocating cutting blade is shown and described in the copending patent application of Herman J. Baldwin for "Apparatus for Sharpening a Reciprocating Cutting Blade of a Material Cutting Machine," Ser. No. 726,697, filed May 6, 1968, and assigned to the same assignee as the assignee of the present application. The present invention is directed to a pair of sharpening bands for sharpening the reciprocating cutting blade.

Thus, the present invention has the desired attributes of the aforesaid Baldwin application in that automatic sharpening of the cutting blade occurs when desired, there is no down time of the material cutting machine for sharpening the knife, the bands are maintained in the desired angular relation to the rotatably mounted cutting blade during rotation of the cutting blade, and there is automatic compensation for any wear of the knife so that the band is always moved into engagement with the cutting blade irrespective of the amount of wear of the cutting blade that will change the distance between the side of the cutting blade to be sharpened and the band to sharpen the cutting blade.

When moving one of the sharpening bands of the present invention into engagement with the cutting blade, a linkage system is utilized that reduces the load on the moving means. Thus, the solenoid, which moves the sharpening band into engagement with the side of the knife to be sharpened, receives stored energy from the other of the linkages that maintains tension on the other sharpening band. This decreases the load required for the solenoid to move the sharpening band into sharpening engagement with the cutting blade.

Additionally, this arrangement permits the other of the sharpening bands, which is not effective for sharpening at the time when the one sharpening band is moved into engagement with the cutting blade, to be moved further away from the cutting blade to insure that there is no accidental engagement of the other sharpening band with the cutting blade. Likewise, there is no conflict or engagement of the one sharpening band with the other sharpening band. This permits both of the sharpening bands to be disposed in the same plane to produce the same amount of sharpening on each side of the cutting blade.

Since only movement of the linkage system is required to position the sharpening band or belt for sharpening engagement with the one side of the cutting blade, a much smaller mass is moved when using the sharpening bands of the present invention rather than the grinding wheels of the aforesaid Baldwin application. Thus, the present invention permits the sharpening means to be more quickly moved into sharpening engagement with the cutting blade while requiring less power than utilized in the aforesaid Baldwin application.

An object of this invention is to provide sharpening bands or belts for sharpening a cutting blade in which one of the bands is moved away from the cutting blade when the other is moved into engagement with the cutting blade.

Another object of this invention is to provide a relatively inexpensive apparatus for sharpening a cutting blade.

Other objects of this invention will be readily perceived from the following description, claims, and drawings.

This invention relates to a material cutting machine comprising a reciprocating cutting blade to cut material with means to remove the cutting blade from engagement with the material being cut. A pair of sharpening bands is disposed on opposite sides of the cutting blade with first means to move the sharpening band on one side of the cutting blade into contact with the one side of the cutting blade when the cutting blade is removed from engagement with the material by the removal means and second means to move the sharpening band on the other side of the cutting blade into contact with the other side of the cutting blade when the cutting blade is returned into engagement with the material being cut. The material cutting machine has means to reduce the force required for each of the first and second means to move the sharpening bands, which are driven by suitable means.

This invention also relates to a material cutting machine comprising a reciprocating cutting blade to cut material and a pair of sharpening bands, which are in the same plane, disposed on opposite sides of the cutting blades to sharpen the cutting blade. The machine has means to produce relative movement between the cutting blade and the sharpening bands. The machine also has first means to move the sharpening band on one side of the cutting blade into contract with the one side of the cutting blade to sharpen the one side of the cutting blade when the producing means causes relative movement of the cutting blade in one direction and second means to move the sharpening band on the other side of the cutting blade into contact with the other side of the cutting blade to sharpen the other side of the cutting blade when the producing means causes relative movement in the opposite direction. The sharpening bands are driven by suitable means.

The attached drawings illustrate a preferred embodiment of the invention, in which.

Figure 1:
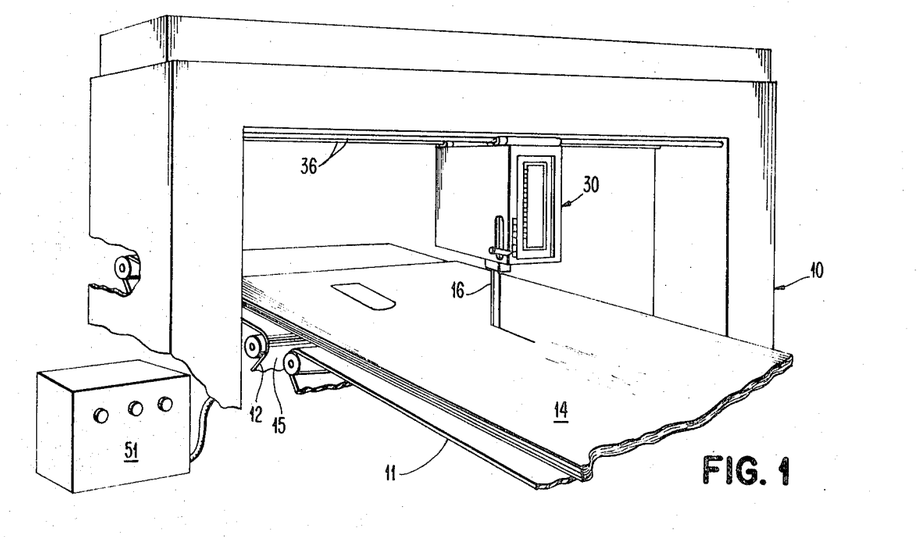
FIG. 1 is a perspective view of a portion of a material cutting machine utilizing the sharpening bands of the present invention.

Referring to the drawings and particularly FIG. 1, there is shown a material cutting machine of the type more particularly shown and described in the aforesaid Sederberg application. The material cutting machine includes stationary support means such as a bridge 10. A pair of endless bands or belts 11 and 12 is adapted to support material 14 thereon.

Figure 7:
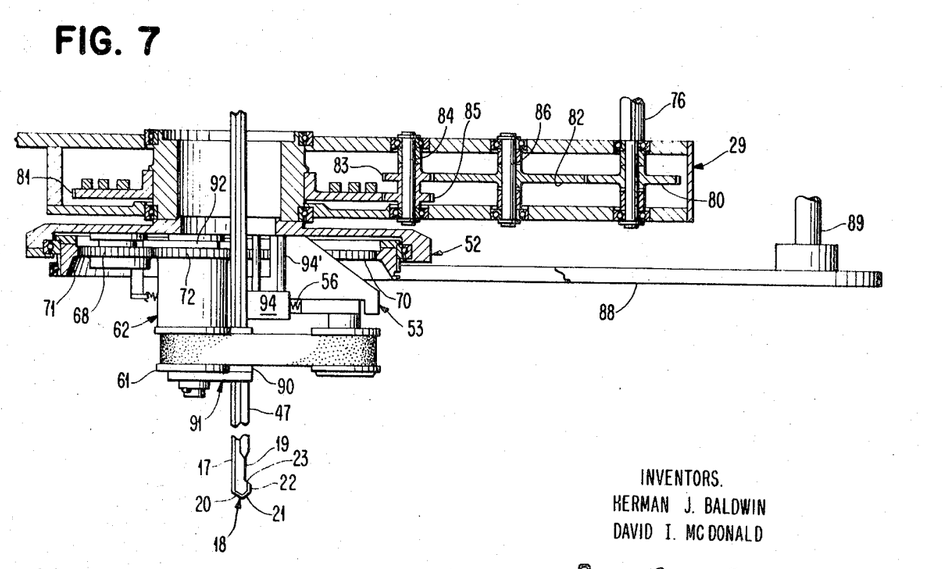
FIG. 7 is a sectional view of a portion of the sharpening unit and showing means for rotating the sharpening bands with the cutting blade.

The endless bands 11 and 12, which are flexible and formed of any suitable material, are adapted to be driven in unison to move the material 14 thereon in a longitudinal direction and relative to the bridge 10. The endless bands 11 and 12 are spaced from each other to form a transverse passage or throat 15 therebetween for reception of a cutting blade or knife 16, The cutting blade 16 has its leading edge 17 (see FIGS. 3 and 7) sharpened to a point to form a cutting surface along its entire length. The cutting blade 16 also has an edge 18 (see FIG. 7), which connects the bottom end of the leading edge 17 with the bottom end of a trailing edge 19 (see FIG. 7), sharpened to a point along its portions 20, 21, and 22. A fourth portion 23 of the connecting edge 18 is not sharpened.

Thus, the cutting blade 16 has both the leading edge 17 and the three portions 20–22 of the connecting edge 18 sharpened to provide cutting surfaces whereby cutting of the material 14 occurs when the connecting edge 18 is moved into engagement with the material 14. Accordingly, the connecting edge 18 forms a piercing edge to penetrate the material 14 when the cutting blade 16 is inserted into the material 14. It should be understood that both the leading edge 17 and the three portions 20–22 of the connecting edge 18 are on both sides of the cutting blade 16.

As more particularly shown and described in the aforesaid Sederberg application, the cutting blade 16 has its upper end attached through suitable connecting means to a motor 24 (see FIGURE 2), which causes reciprocation of the cutting blade 16 with respect to the material 14 supported on the endless bands 11 and 12 to cut the material 14. Thus, as the motor 24 rotates, the cutting blade 16 is reciprocated.

The motor 24 is fixedly secured to an upper portion 25 of a vertical movable frame 26 for support thereby. The frame 26 is slidably supported on a plurality of rods 27 (one shown in FIGURE 2), which extend between an upper plate or disk 28 and a support frame 29 for the sharpening unit.

The upper plate 28 forms the top wall of a housing 30 within which the motor 24 and the connecting means between the cutting blade 16 and the motor 24 are disposed. A lower plate 31 is fixedly secured to front wall 32 of the housing 30 and to the support frame 29.

The upper end of each of the rods 27 is permanently secured to the upper plate 28 through being pinned to a bushing 33, which is welded to the plate 28. The lower end of each of the rods 27 is permanently secured to the support frame 29 by a pin. Thus, the support frame 29 is fixedly secured to the upper plate 28 and supported thereby through the rods 27 being fixedly secured to the upper plate 28 and the support frame 29.

Figure 2:
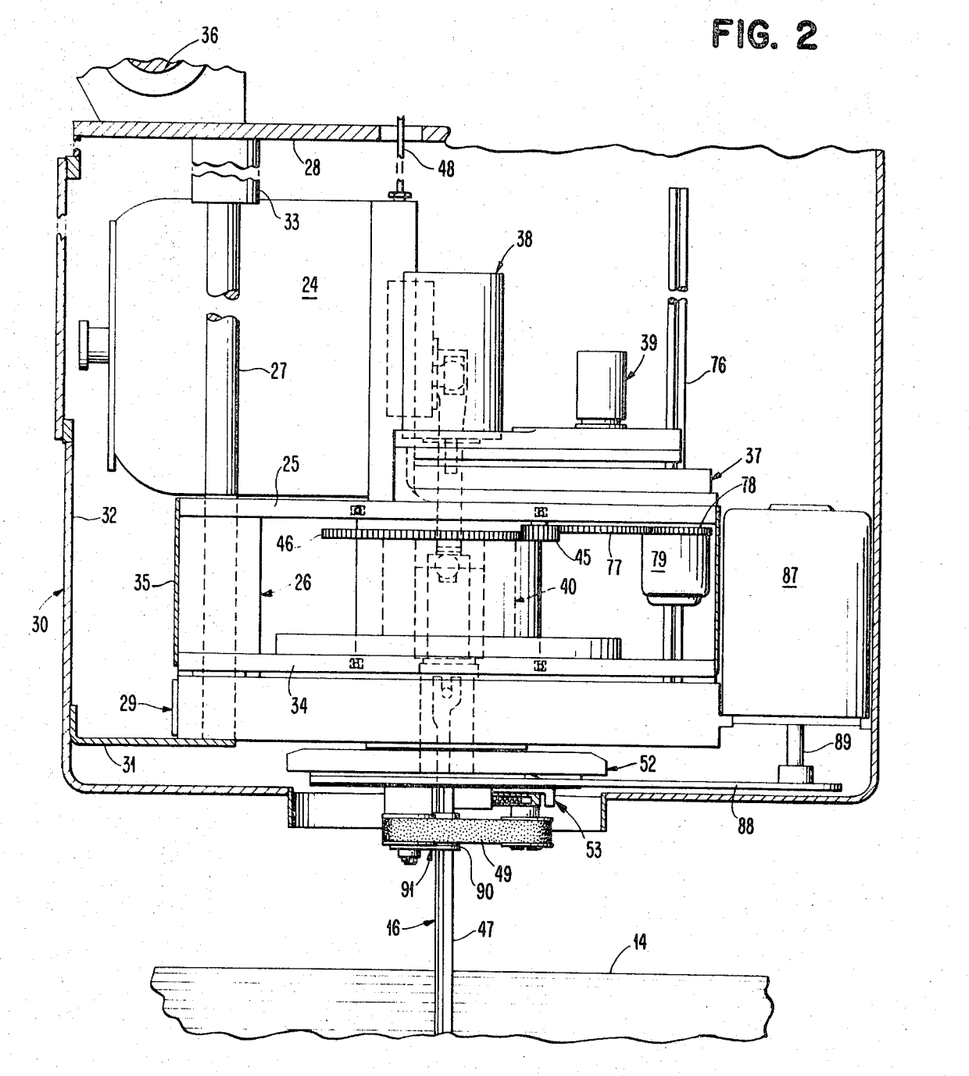
FIG. 2 is a side elevational view, partly in section, of a portion of the material cutting machine of FIG. 1 including the sharpening bands with some parts omitted for clarity purposes.

As shown in FIGURE 2, the supper portion 25 and a lower portion 34 of the frame 26 are connected to each other by a thin continuous member 35. The member 35 extends from the upper portion 25 to almost the bottom of the lower portion 34 to make the frame 26 unitary.

As more particularly shown and described in the aforesaid Sederberg application, the upper plate 28 is slidably supported on cylindrical ways 36 (see FIGURE 1). This permits the cutting blade 16 to be moved transversely through the passage 15 as more particularly shown and described in the aforesaid Sederberg application.

The vertical movable frame 26 has a gear box 37 fixedly disposed on the upper surface of the upper portion 25 of the frame 26 for vertical movement therewith. The gear box 37 fixedly supports a motor 38 and a feedback resolver 39 on its upper surface.

A rotary box 40 is rotatably supported between the upper portion 25 and the lower portion 34 of the vertical movable frame 26. The rotary box 40 is adapted to be rotated by the motor 38.

The drive from the motor 38 to the rotary box 40 is through a pinion gear 41 (see FIG. 9) on shaft 42 of the motor 38 meshing with a pinion gear 43 on a shaft 44, which is rotatably mounted within the gear box 37. The shaft 44 has a second pinion gear 45 meshing with a bull gear 46, which is fixedly secured to the upper end of the rotary box 40. Accordingly, whenever the motor 38 is energized, the rotary box 40 is rotated.

As more particularly shown and described in the aforesaid Sederberg application, the rotary box 40 functions as a guide member for a portion of the connecting means from the motor 24 to the cutting blade 16. Thus, rotation of the rotary box 40 causes rotation of the cutting blade 16 to change its heading.

As more particularly shown and described in the aforesaid Sederberg application, the cutting blade 16 reciprocates within a nonreciprocating guide member 47. The guide member 47 is adapted to be rotated with the rotary box 40 as more particularly shown and described in the aforesaid Sederberg application. The bottom edge or end of the guide member 47 is preferably sharpened to a point as more particularly shown and described in the aforesaid Sederberg application.

As previously mentioned, the frame 26, which carries the reciprocating motor 24 of the cutting blade 16 thereon, is slidably mounted on the rods 27. The frame 26 and the structure supported thereby are adapted to be moved upwardly from the position of FIG. 2 through actuation of a cable 48.

As shown in FIG. 2, one end of the cable 48 is attached to the motor 24. Accordingly, when the cable 48 is pulled upwardly, the frame 26, the motor 24, the cutting blade 16, the connecting means between the cutting blade 16 and the motor 24, the gear box 37 and related structure, and the rotary box 40 and related structure are lifted upwardly. The actuation of the cable 48 is more particularly shown and described in the aforesaid Sederberg application.

The cutting blade 16 must have the cutting edges 17 and 18 sufficiently sharpened to cut the material 14 being cut. Likewise, the bottom edge of the guide member 47 must be sharpened at the same regular intervals.

The unit for sharpening the cutting blade 16 and the guide member 47 includes a pair of sharpening bands or belts 49 and 50 (see FIG. 3), which are preferably abrasive coated, disposed on opposite sides of the cutting blade 16 and the guide member 47. When the cutting blade 16 is to be sharpened, one of the abrasive bands 49 and 50 is moved into engagement with one side of each of the leading edge 17 and the portions 20–22 of the connecting edge 18 of the cutting blade 16 during upward movement of the cutting blade 16, and the other of the sharpening bands 49 and 50 is moved into engagement with the other side of the leading edge 17 and the portions 20–22 of the connecting edge 18 of the cutting blade 16 when the cutting blade 16 is returned into cutting engagement with the material 14. Of course, the bands 49 and 50 also sharpen the bottom edge or end of the guide member 47 at the same time.

In order to sharpen the entire length of the cutting blade 16, it is necessary to lift the cutting blade 16 and the guide member 47 a greater distance from the material 14 than is normally required when lifting the cutting blade 16 and the guide member 47 to form a sharp corner or notch in the material 14 being cut. Thus, it is necessary to render a switch (not shown), which limits the lifting of the cutting blade 16 and the guide member 47 when sharpening is not performed, inactive when the cutting blade 16 and the guide member 47 are to be sharpened by the sharpening bands or belts 49 and 50.

Of course, sharpening of the cutting blade 16 and the guide member 47 occurs when the cutting blade 16 and the guide member 47 are removed from the material 14 so as to form a sharp corner or notch in the material 14. However, the height to which the cutting blade 16 and the guide member 47 are lifted is much greater.

Since the entire pattern cut in the material 14 by the cutting blade 16 is controlled by a numerical control apparatus 51 (see FIG. 1), the instances when the cutting blade 16 must be lifted to a greater height than that required for merely notching or forming a sharp corner in the material 14 are programmed into the numerical control apparatus 51.

It should be understood that the specific pattern to be cut in the material 14 is provided as an input to the numerical control apparatus 51. This input controls the output of the numerical control apparatus 51 in the well-known manner to produce the desired movements to cut the desired pattern in the material 14. Thus, the input to the numerical control apparatus 51 is such that when sharpening of the cutting blade 16 and the guide member 47 are to occur, the numerical control apparatus 51 causes a greater lifting of the cutting blade 16 and the guide member 47 than is normally produced when the cutting blade 16 and the guide member 47 are lifted to form a notch or sharp corner in the material 14.

Of course, the input to the numerical control apparatus 51 also determines when it is necessary to lift the cutting blade 16 from the material 14 to turn the cutting blade 16 with respect to its previous heading. Thus, when a small angle is to be cut in the material 14, the input to the numerical control apparatus 51 is such that rotation of the cutting blade 16 occurs about its cutting axis without the cutting blade 16 being lifted from cutting engagement with the material 14.

To maintain the sharpening bands or belts 49 and 50 always properly positioned with respect to the cutting blade 16, it is necessary for the support structure for the sharpening bands 49 and 50 to be rotated with the cutting blade 16 to maintain the desired angular relationship between the sharpening bands 49 and 50 and the cutting blade 16. Accordingly, the sharpening bands or belts 49 and 50 are supported on a rotary plate 52 (see FIG. 7), which is rotatably mounted on the fixed support frame 29.

Figures 6, 8, 9:
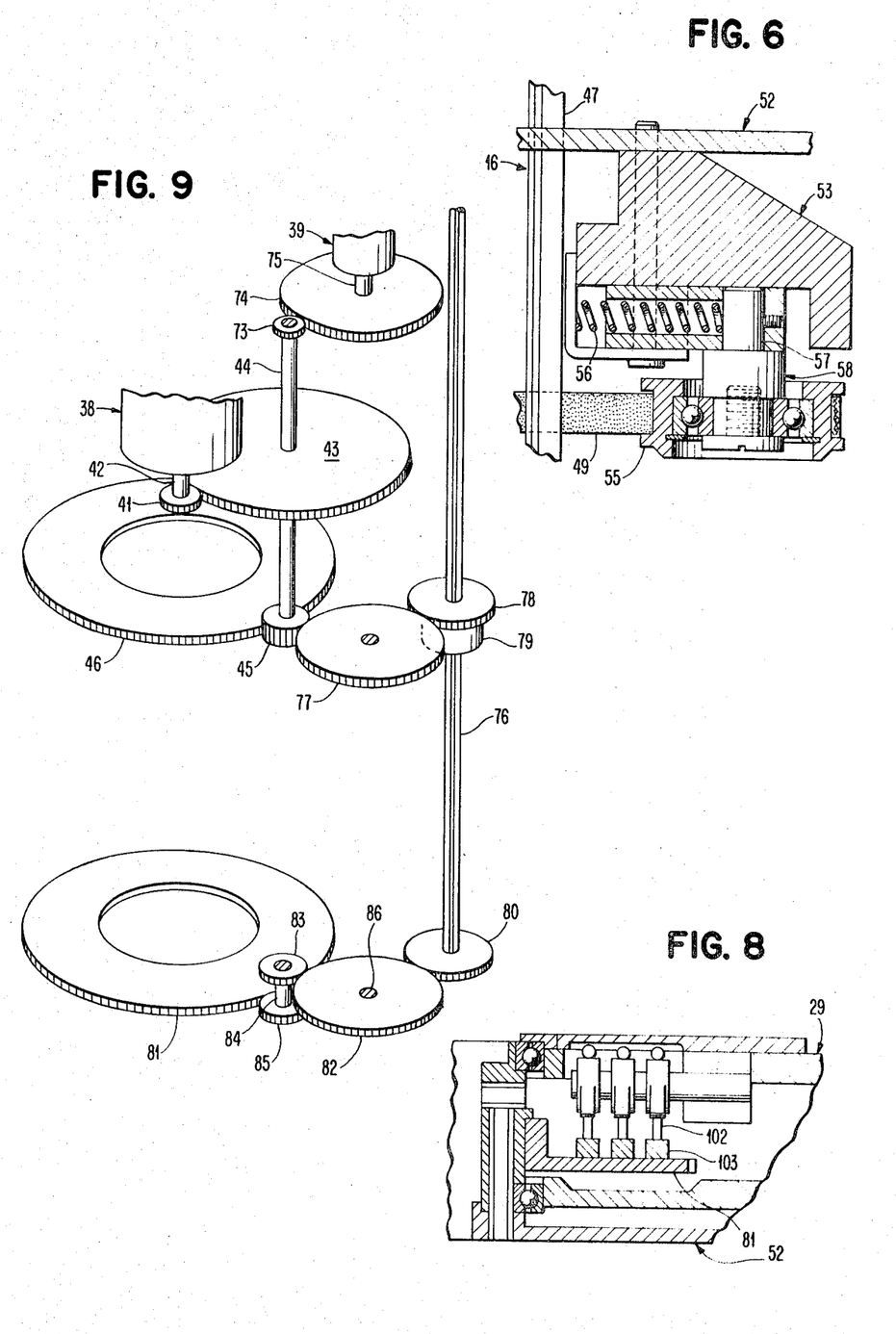
FIG. 6 is an enlarged sectional view of a portion of the sharpening unit of FIG. 3 and taken along line 6—6 of FIG. 3.
FIG. 8 is a sectional view of a portion of the frame for supporting the sharpening unit and taken at a different position than FIG. 7.
FIG. 9 is a schematic perspective view showing the gearing relation between various portions of the material cutting machine including the sharpening unit of the present invention.

The rotary plate 52 has a pair of support housings 53 and 54 (see FIG. 3) secured to its lower surface. As shown in FIG. 6, the support housing 53 rotatably supports a pulley 55. The sharpening band 49 is passed around the pulley 55.

A compression spring 56, which is mounted within the housing 53, acts against a reduced portion 57 (see FIG. 6 of a member 58, which is supported by the housing 53, on which the pulley 55 is rotatably mounted to create a desired tension on the belt 49. Thus, the spring 56 preloads the belt 49.

A similar arrangement exists for the belt 50. Thus, a spring 59 (see FIG. 3) causes preloading of a pulley 60, which is rotatably mounted on the support housing 54.

The belt 49 extends around a drive pulley 61 (see FIG. 5) on the lower end of a cylindrical member 62, which is carried by the rotary plate 52, and integral therewith. The cylindrical member 62 is carried by the rotary plate 52 through being rotatably mounted on a torque tube 63, which is rotatably mounted on a stud 64. The stud 64 is fixedly secured to the rotary plate 52.

The sharpening band or belt 50 is similarly supported on a drive pulley 65 (see FIG. 3) on the lower end of a cylindrical member 66, which also is rotatably carried by the rotary plate 52 in the same manner as is the cylindrical member 62, and integral therewith. The cylindrical member 66 has a gear 67 on its upper end meshing with an idler gear 68, which is rotatably mounted on a support plate 69 (see FIG. 5) that is fixed to the lower surface of the rotary plate 52. The idler gear 68 meshes with an internal gear 70 on an annular member 71, which is rotatably mounted in the rotary plate 52. Thus, whenever the annular member 71 is rotated, the sharpening band 50 is rotated.

The gear 67 on the cylindrical member 60 meshes with a gear 72 (see FIGS. 3 and 5), which is formed on the upper end of the cylindrical member 62. Accordingly, the drive is from the gear 68 through the gear 67 to the gear 72. Thus, the sharpening band 49 also is rotated whenever the annular member 71 is rotated.

Figure 3:
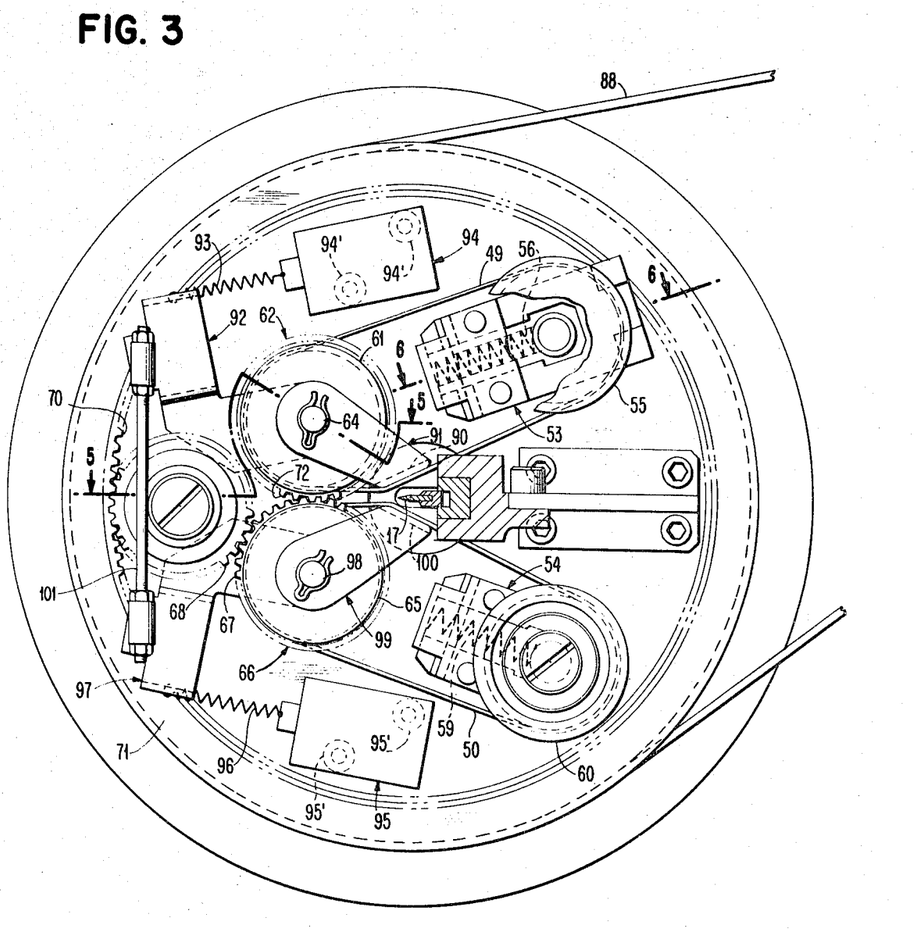
FIG. 3 is a bottom plan view of the sharpening unit of the present invention.

Since the sharpening bands 49 and 50 are carried by the rotary plate 52, they rotate with the rotary plate 52. Since the rotary plate 52 is rotated by the motor 38, which also rotates the cutting blade 16, the rotary plate 52 is rotated the same amount as the cutting blade 16. Accordingly, the sharpening bands 49 and 50 maintain their desired angular relationship, as shown in FIG. 3, to the cutting blade 16 during any rotation of the cutting blade 16.

Furthermore, the motor 38 is connected through the gear train to the resolver 39. This drive to the resolver 39 from the motor 38 is through the pinion gears 41 and 43 to the shaft 44, which also has a pinion gear 73 (see FIG. 9) thereon in addition to the pinion gears 43 and 45. The pinion gear 73 meshes with a pinion gear 74, which is mounted on shaft 75 of the resolver 39. Thus, the resolver 39 provides an electrical feedback to the numerical control apparatus 51 to indicate the amount of rotation produced by the motor 38.

Since the rotary plate 52 is rotatably mounted on the non-rotating support frame 29, which does not move vertically, a ball spline 76 is rotatably mounted in the frame 29 and is driven by the pinion gear 45 through an idler gear 77 and a gear 78 on a ball spline driver 79, which slides vertically on the ball spline 76. This permits the pinion gear 45 to move vertically relative to the spline 76 while still rotating the spline 76. It should be understood that both the gears 77 and 78 are rotatably supported by the gear box 37 and move therewith too.

The lower end of the spline 76 has a pinion gear 80 fixedly attached thereto. The pinion gear 80 drives a bull gear 81, which is fixedly secured to the rotary plate 52, through an idler gear 82, a pinion gear 83, a shaft 84, and a pinion gear 85. The idler gear 82 is fixedly secured to a shaft 86, which is rotatably mounted in the fixed support frame 29, and the pinion gear 83 is fixedly connected to the shaft 84, which also is rotatably mounted in the support frame 29. The shaft 83 also has the pinion gear 85, which meshes with the bull gear 81, mounted thereon. Accordingly, energization of the motor 38 not only causes rotation of the cutting blade 16 but also rotates the rotary plate 52 whereby the sharpening bands 49 and 50 maintain their desired angular relation, as shown in FIG. 3, to the cutting blade 16.

When the sharpening bands 49 and 50 are to engage the cutting blade 16 to sharpen the cutting blade 16, it is necessary to drive the sharpening bands 49 and 50 to produce the sharpening of the cutting blade 16 and the guide member 47. The sharpening bands 49 and 50 are driven by a motor 87 (see FIG. 2), which is supported within the housing 30 on the support frame 29. The motor 87 is energized only when the sharpening belts or bands 49 and 50 are to sharpen the cutting blade 16 and the guide member 47.

A timing belt 88 (see FIGS. 2 and 7) extends between a geared pulley on shaft 89 of the motor 87 and a geared pulley on the annular member 71. Since the annular member 71 is connected through gearing to the drive pulleys 61 and 65, the sharpening bands 49 and 50 are driven simultaneously in the same direction when the motor 87 is energized. Energization of the motor 87 is controlled by the numerical control apparatus 51. Accordingly, whenever the motor 87 is energized, the cylindrical members 62 and 66 are rotated.

When sharpening of the cutting blade 16 is desired, it is necessary to move the sharpening band 49 into engagement with the cutting blade 16 during movement of the cutting blade 16 in one vertical direction and to move the sharpening band 50 into engagement with the cutting blade 16 when the cutting blade moves in the other vertical direction. Thus, suitable means are employed to move each of the sharpening bands 49 and 50 into engagement with the cutting blade 16 to sharpen the cutting blade 16. It should be understood that this movement of the bands results in the guide member 47 also being sharpened.

Figure 5:
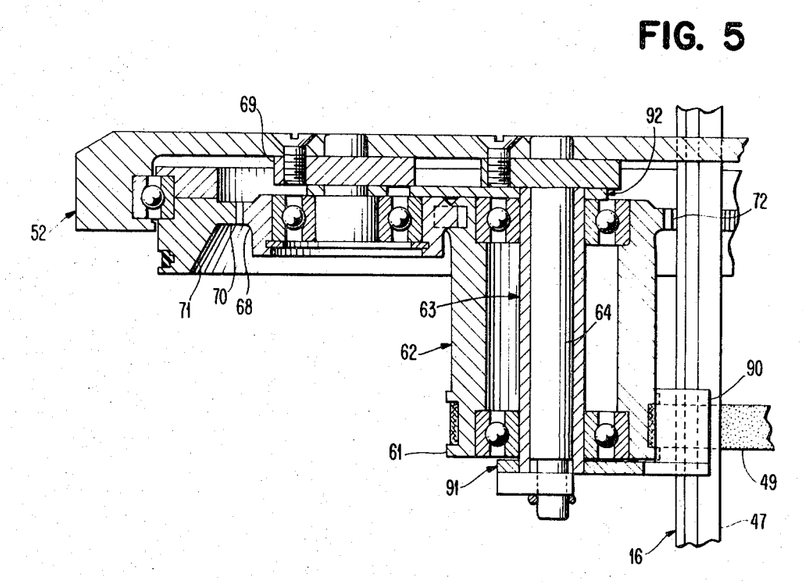
FIG. 5 is an enlarged sectional view of a portion of the sharpening unit of FIG. 3 and taken along line 5—5 of FIG. 3.

As shown in FIG. 3, a foot 90 on a lever or shoe 91 acts against the sharpening band 49. As shown in FIG. 5, the lever 91 is fixedly secured to the lower end of the torque tube 63. The upper end of the torque tube 63 is fixedly secured to a lever 92. The lever 92 is connected through a tension spring 93 (see FIG. 3) to a plunger of a solenoid 94, which is supported from the lower surface of the rotary plate 52 in spaced relation thereto by a pair of cylindrical support blocks 94'. Accordingly, when the solenoid 94 is energized, the lever 91 is rotated clockwise (as viewed in FIG. 3) due to retraction of the plunger of the solenoid 94. By overloading the spring 93, the solenoid 94 may have its plunger fully retracted. Furthermore, the spring 93 compensates for wear of the cutting blade 16.

The sharpening band 50 is moved into contact with the cutting blade 16 whenever a solenoid 95, which is supported from the lower surface of the rotary plate 52 in spaced relation thereto by a pair of cylindrical support blocks 95', is energized. The solenoid 95 is connected through a tension spring 96 and a lever 97 to the upper end of a torque tube 98, which is the same as the torque tube 63. The lever 97 is fixedly secured to the torque tube 98.

The lower end of the torque tube 98 has a lever 99 fixedly secured thereto. The lever or shoe 99 has foot 100 on its end for cooperation with the sharpening band 50 in the same manner as the foot 90 cooperates with the sharpening band 49. Accordingly, whenever the solenoid 95 is energized, the lever 99 is rotated counterclockwise (as viewed in FIG. 3) to move the sharpening band 50 into engagement with the cutting blade 16 for sharpening the cutting blade 16.

By overloading the spring 96, the solenoid 95 may have its plunger fully retracted when the solenoid 95 is energized. Furthermore, the spring 96 compensates for wear of the cutting blade 16.

Figure 4:
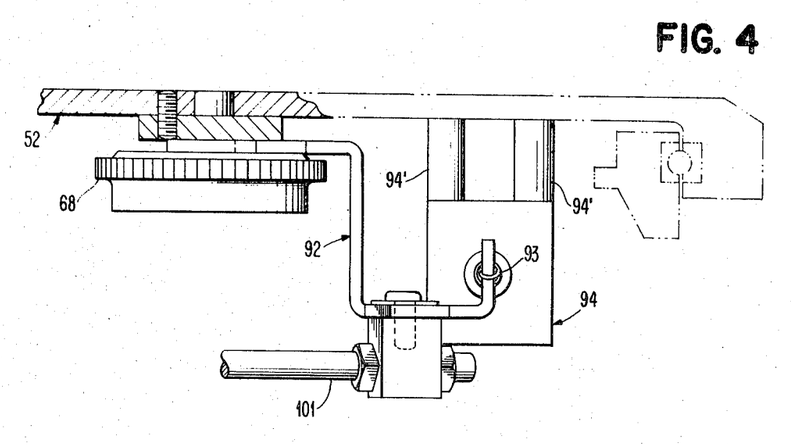
FIG. 4 is a side elevational view of a portion of the structure of FIG. 3 showing the relationship between parts of the linkage system.

A turnbuckle rod 101 is connected to the levers 92 and 97 to interconnect them. The connection between the rod 101 and the lever 92 is shown in FIG. 4. The lever 97 is similarly mounted to the rod 101. Accordingly, any movement of one of the levers 92 and 97 results in movement of the other of the levers 92 and 97.

For example, when the solenoid 94 is energized to rotate the lever 92 clockwise (as viewed in FIG. 3) about the axis of the torque tube 63, the lever 97 also is rotated clockwise (as viewed in FIG. 3) about the axis of the torque tube 98. As a result, when the foot 90 moves into engagement with the sharpening band 49 to cause it to engage against the adjacent side of the cutting blade 16 to sharpen the cutting blade 16 and the guide member 47, the foot 100 is moved away from engagement with the sharpening band 50. This reduces the tension in the sharpening band 50 whereby the band 50 is removed a further distance away from the cutting blade 16 since it is not to sharpen the cutting blade 16 at this time. This avoids any possibility of the sharpening band 50 interfering with the sharpening band 49 during sharpening of the cutting blade 16 by the sharpening band 49.

Furthermore, the energy, which is stored in the band 50, is transmitted through the turnbuckle rod 101 to reduce the force required by the solenoid 94 to move the foot 90 to cause the sharpening band 49 to engage the cutting blade 16. Thus, due to the turnbuckle rod 101 interconnecting the levers 92 and 97, less power is required from the solenoid 94 to move the sharpening band 49 into engagement with the cutting blade 16.

Similarly, when the solenoid 95 is energized, the foot 90 is moved away from engagement with the sharpening band 49 at the time that the foot 100 moves the sharpening band 50 into engagement with the cutting blade 16. This not only results in the sharpening band 49 being moved out of possible interference with the sharpening band 50 during the time when the sharpening band 50 is in sharpening engagement with the cutting blade 16 but also aids in reducing the power required from the solenoid 95 to move the sharpening band 50 into engagement with the cutting blade 16.

Thus, when sharpening of the cutting blade 16 is to occur, the numerical control apparatus 51 not only causes energization of the motor 87 to drive the sharpening bands 49 and 50 but also energizes the solenoid 94 before lifting of the cutting blade 16 occurs. As a result, the sharpening band 49 is moved into engagement with the side of the cutting blade 16 adjacent thereto to sharpen both the leading edge 17 and the portions 20-22 of the connecting edge 18 as the cutting blade 16 is lifted upwardly. The band 49 also sharpens the guide member 47.

The sharpening band 49 is removed from engagement with the cutting blade 16 before the cutting blade 16 is returned into cutting engagement with the material 14. It is necessary to energize the solenoid 95 and de-energize the solenoid 94 before downward movement of the cutting blade 16 occurs. Thus, when the cutting blade 16 moves downwardly, the sharpening band 50 is disposed for engagement with the side of the cutting blade 16 adjacent thereto.

When the cutting blade 16 is returned into cutting engagement with the material 14, the solenoid 95 is de-energized whereby the band 50 is removed from engagement with the cutting blade 16 and returns to the position of FIG. 3. At the same time, the motor 87 is de-energized to stop drive of the sharpening bands 49 and 50.

Considering the operation of the present invention, sharpening of the cutting blade 16 occurs during one of the times when the cutting blade 16 is lifted out of cutting engagement with the material 14. When sharpening is to occur, the switch (not shown), which normally supplies the signal to the numerical control apparatus 51 for stopping lifting of the motor 24 as more particularly shown and described in the aforesaid Sederberg application, is rendered inactive. As a result, the cutting blade 16 is lifted to the desired maximum height whereby the leading edge 17 and the portions 20–22 of the connecting edge 18 may be sharpened by the sharpening belts 49 and 50. This also results in sharpening of the guide member 47.

As previously mentioned, the sharpening band 49 is effective to sharpen the cutting blade 16 when the cutting blade 16 is lifted. The sharpening band 50 is utilized to sharpen the cutting blade 16 during downward movement of the cutting blade 16. Accordingly, no down time of the material cutting machine of the present invention is required for sharpening the cutting blade 16 and the guide member 47. Instead, it is only necessary to raise the cutting blade 16 and the guide member 47 higher than in most cycles of raising and lowering. The numerical control apparatus 51 controls energization of the motor 87 and the solenoids 94 and 95 to insure proper correlation between the sharpening bands 49 and 50 and the cutting blade 16.

The electrical supply to the solenoids 94 and 95 is supplied through three brushes 102 (see FIG. 8) on the support frame 29 cooperating with three slip rings 103, which are mounted on the bull gear 81 of the rotary plate 52. Thus, electrical current is always available for the solenoids 94 and 95.

While the present invention has been particularly shown and described for use with a material cutting machine having a single axis of rotation as more particularly shown and described in the aforesaid Sederberg application, it should be understood that the sharpening unit of the present invention may be utilized with a cutting blade having two axes of rotation as shown and described in the copending patent application of Edward C. Bruns for "Materal Cutting Machine Having Reciprocating Cutting Blade With Two Axes of Rotation," Ser. No. 726,658, filed May 6, 1968, now U.S. Pat. No. 3,507,177, and assigned to the same assignee as the assignee of the present application.

When using the sharpening unit of the present invention with the material cutting machine of the aforesaid Bruns application, it would be necessary to position the sharpening bands 49 and 50 so that each would contact one side of the cutting blade when moved into engagement therewith. Thus, one of the sharpening bands 49 and 50 would have to be adapted to move into engagement with the cutting blade 16 when it was rotatable about one of the two axes of rotation while the other of the sharpening bands 49 and 50 would have to be adapted to move into the cutting blade 16 when it is rotatable about the other of the axes of rotation. This would necessitate the levers 91 and 99 having different lengths.

While the sharpening bands 49 and 50 have been described as being abrasive coated, it should be understood that the belts 49 and 50 may be formed of any material capable of sharpening the cutting blade 16 and the guide member 47.

An advantage of this invention is that it reduces the power required from the solenoid for moving sharpening means into engagement with a cutting blade. Another advantage of this invention is that it insures that only one of the sharpening bands contacts the cutting blade and the guide member during sharpening.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A material cutting machine comprising:
    a reciprocating cutting blade to cut material;
    means to remove said cutting blade from engagement with the material being cut;
    a pair of sharpening bands disposed on opposite sides of said cutting blade;
    first means to move said sharening band on one side of said cutting blade into contact with the one side of said cutting blade when said cutting blade is removed from engagement with the material by said removal means;
    second means to move said sharpening band on the other side of said cutting blade into contact with the other side of said cutting blade when said cutting blade is returned into engagement with the material being cut;
    means to reduce the force required from each of said first and second means to move said sharpening band;
    and means to drive said sharpening bands.

2. The material cutting machine according to claim 1 including:
    third means acting on said sharpening band on the one side of said cutting blade to put said sharpening band on the one side of said cutting blade under tension;
    fourth means acting on said sharpening band on the other side of said cutting blade to put said sharpening band on the other side of said cutting blade under tension;
    said first means being connected to said third means to move said sharpening band on the one side of said cutting blade into contact with the one side of said cutting blade when said first means is actuated;
    and said second means being connected to said fourth means to move said sharpening band on the other side of said cutting blade into contact with the other side of said cutting blade when said second means is actuated.

3. The material cutting machine according to claim 2 in which said reducing means includes means to move said fourth means in response to actuation of said first means to reduce the tension put on said sharpening band on the other side of said cutting blade by said fourth means whereby the stored energy aids said first means and to move said third means in response to actuation of said second means to reduce the tension put on said sharpening band on the one side of said cutting blade by said third means whereby the stored energy aids said second means.

4. The material cutting machine according to claim 1 in which said pair of sharpening bands is disposed in the same plane.

5. The material cutting machine according to claim 1 in which each of said sharpening bands is an abrasive coated band.

6. The material cutting machine according to claim 2 in which:
    said first means includes a first solenoid;
    said second means includes a second solenoid;
    said third means includes pivotally mounted linkage means connected to said first solenoid;
    and said fourth means includes pivotally mounted linkage means connected to said second solenoid.

7. The material cutting machine according to claim 6 in which said reducing means includes means connecting said pivotally mounted inkage means to each other.

8. A material cutting machine comprising:
    a reciprocating cutting blade to cut material;
    a pair of sharpening bands disposed on opposite sides of said cutting blade to sharpen said cutting blade, said sharpening bands being disposed in the same plane;
    means to produce relative movement between said cutting blade and said sharpening bands;
    first means to move said sharpening band on one side of said cutting blade into contact with the one side of said cutting blade to sharpen the one side of said cutting blade when said producing means causes relative movement of said cutting blade in one direction;

second means to move said sharpening band on the other side of said cutting blade into contact with the other side of said cutting blade to sharpen the other side of said cutting blade when said producing means causes relative movement in the opposite direction;

and means to drive said sharpening bands.

9. The material cutting machine according to claim 8 including means to reduce the force required from each of said first and second means to move said sharpening bands.

References Cited

UNITED STATES PATENTS

| | | | |
|---|---|---|---|
| 3,350,818 | 11/1967 | Clark | 51—246 |
| 2,945,332 | 7/1960 | Gury | 51—246 |
| 2,450,473 | 10/1948 | Goldie | 30—139 |
| 2,753,670 | 7/1956 | Carapucci | 51—246 |

JAMES L. JONES, JR., Primary Examiner

U.S. Cl. X.R.

51—246

UNITED STATES PATENT OFFICE
CERTIFICATE OF CORRECTION

Patent No. 3,548,495 Dated December 22, 1970

Inventor(s) Herman J. Baldwin et al.

It is certified that error appears in the above-identified patent and that said Letters Patent are hereby corrected as shown below:

Column 2, line 55, "blades" should read -- blade --; line 59, "contract" should read -- contact --. Column 3, line 41, "16," should read -- 16. --. Column 4, line 13, "supper" shoul read -- upper --. Column 6, line 5, after "6" insert a closing parenthesis. Column 10, line 3, "sharening" should read -- sharpening --; line 63, "inkage" should read -- linkage --.

Signed and sealed this 1st day of June 1971.

(SEAL)
Attest:

EDWARD M. FLETCHER, JR.
Attesting Officer

WILLIAM E. SCHUYLER, JR.
Commissioner of Patents